(12) United States Patent
Ranganathan et al.

(10) Patent No.: US 12,094,181 B2
(45) Date of Patent: Sep. 17, 2024

(54) SYSTEMS AND METHODS FOR UTILIZING NEURAL NETWORK MODELS TO LABEL IMAGES

(71) Applicant: Verizon Patent and Licensing Inc., Basking Ridge, NJ (US)

(72) Inventors: Prakash Ranganathan, Villupuram (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 17/724,036

(22) Filed: Apr. 19, 2022

(65) Prior Publication Data

US 2023/0334814 A1    Oct. 19, 2023

(51) Int. Cl.
| | |
|---|---|
| *G06V 10/20* | (2022.01) |
| *G06N 3/045* | (2023.01) |
| *G06V 10/25* | (2022.01) |
| *G06V 10/774* | (2022.01) |
| *G06V 10/82* | (2022.01) |
| *G06V 20/70* | (2022.01) |

(52) U.S. Cl.
CPC ........... *G06V 10/255* (2022.01); *G06N 3/045* (2023.01); *G06V 10/25* (2022.01); *G06V 10/7747* (2022.01); *G06V 10/82* (2022.01)

(58) Field of Classification Search
CPC .. G06V 10/255; G06V 10/25; G06V 10/7747; G06V 10/82; G06V 10/774; G06V 10/762; G06V 10/776; G06N 3/045; G06N 3/0895
See application file for complete search history.

(56) References Cited

U.S. PATENT DOCUMENTS

| | | | |
|---|---|---|---|
| 2021/0390342 A1* | 12/2021 | Juillard | G06V 10/7784 |
| 2022/0292306 A1* | 9/2022 | Radhakrishnan | G06V 10/82 |
| 2022/0375090 A1* | 11/2022 | Hwang | G06T 7/11 |
| 2022/0388535 A1* | 12/2022 | Singh | G06V 10/82 |
| 2022/0391639 A1* | 12/2022 | Gurumurthy | G06T 15/005 |
| 2023/0004760 A1* | 1/2023 | Mustikovela | G06V 20/56 |
| 2023/0097169 A1* | 3/2023 | Dwivedi | G06F 18/29 |
| | | | 706/15 |

* cited by examiner

*Primary Examiner* — Syed Haider

(57) ABSTRACT

A device may receive unprocessed images to be labeled, and may utilize a first neural network model to identify objects of interest in the unprocessed images and bounding boxes for the objects of interest. The device may annotate the objects of interest to generate annotated objects of interest, and may utilize a second neural network model to group the annotated objects of interest into clusters. The device may utilize a third neural network model to determine labels for the clusters, and may request manually-generated labels for clusters for which labels are not determined. The device may receive the manually-generated labels, and may label the unprocessed images with the labels and the manually-generated labels to generate labeled images. The device may generate a training dataset based on the labeled images, and may train a computer vision model with the training dataset to generate a trained computer vision model.

20 Claims, 11 Drawing Sheets

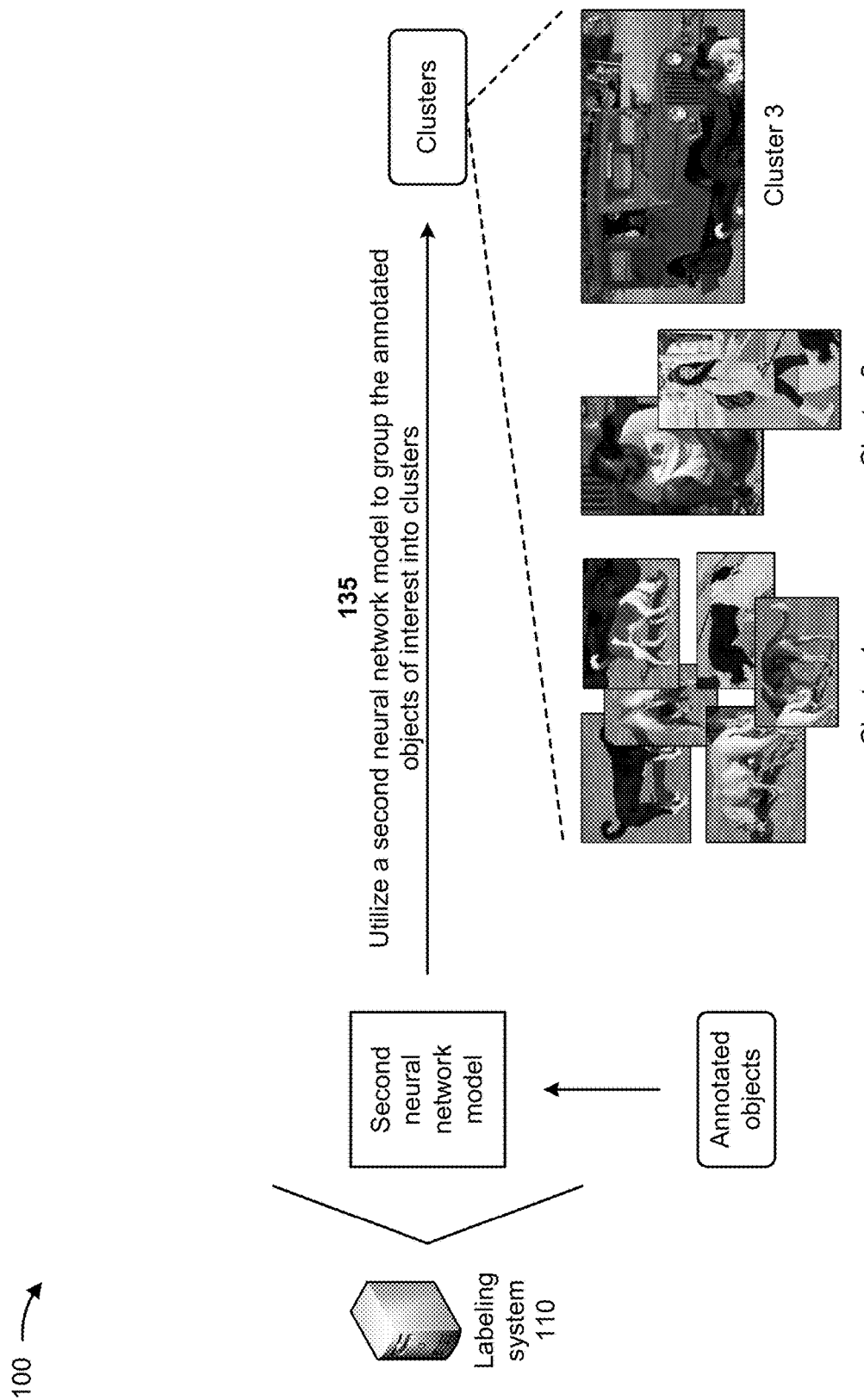

SYSTEMS AND METHODS FOR UTILIZING NEURAL NETWORK MODELS TO LABEL IMAGES

BACKGROUND

A computer vision model is a model that translates visual data based on features and contextual information identified during training of the computer vision model. This enables a computer vision model to interpret images and video and apply those interpretations to predictive or decision making tasks.

BRIEF DESCRIPTION OF THE DRAWINGS

FIGS. 1A-1G are diagrams of an example implementation described herein.

DETAILED DESCRIPTION OF EXAMPLE EMBODIMENTS

Figure 1A:
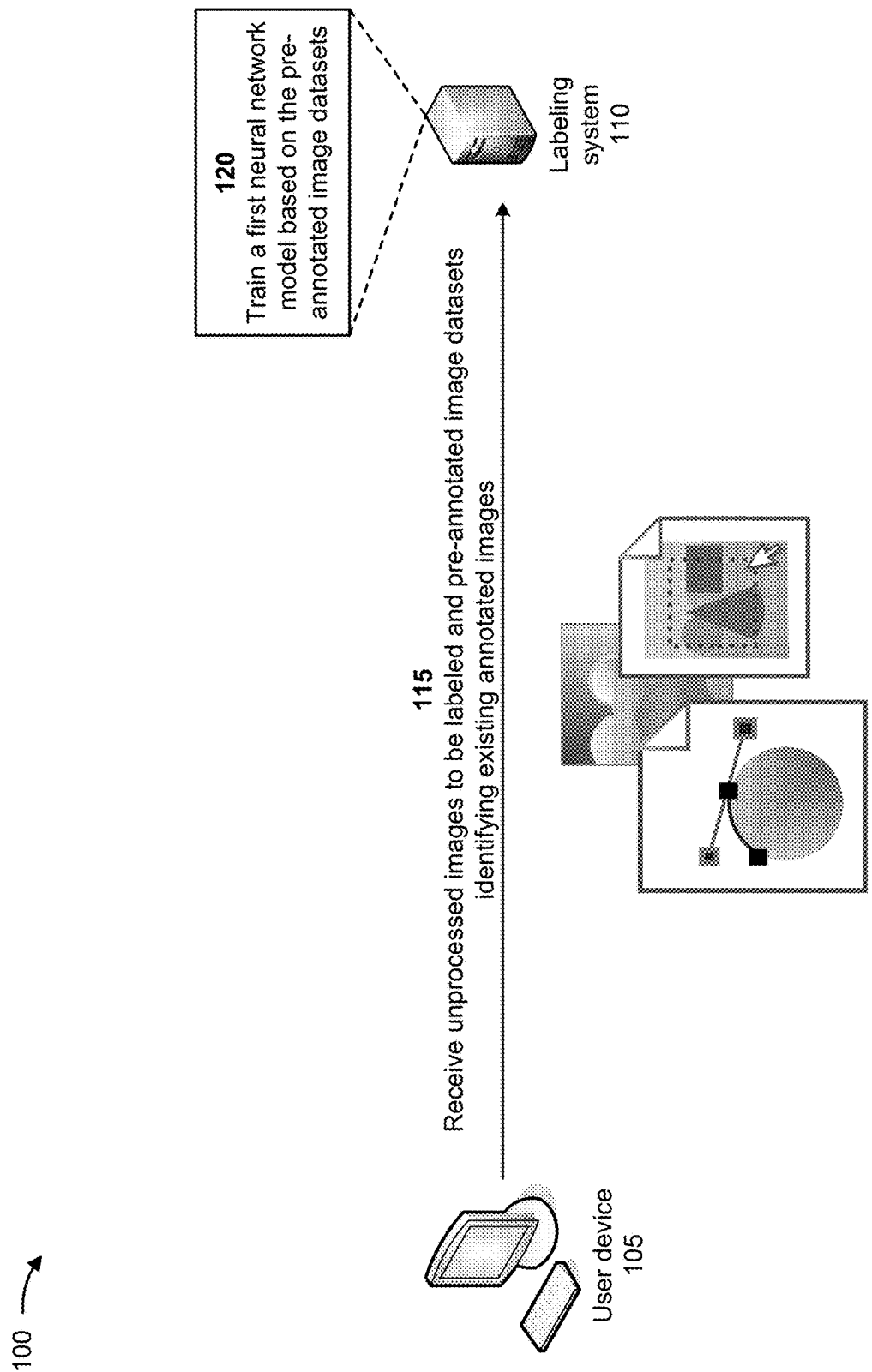

The following detailed description of example implementations refers to the accompanying drawings. The same reference numbers in different drawings may identify the same or similar elements.

A large set of pre-labeled images is generally considered a prerequisite for training computer vision models and utilizing the trained computer vision models. However, labeling images is a tedious and time-consuming task that requires huge investments in terms of both manpower, time and cost. It may take manual labelers over six months, for example, to label training data for a few computer vision models, and such an endeavor may still result in incorrectly labeled images. When model development and deployment timelines are considered, it may require at least one year for a production grade computer vision model to be built and deployed. The time required to build, train, and deploy a computer vision model may be directly proportional to a cost involved. Thus, current techniques for training computer vision models consume computing resources (e.g., processing resources, memory resources, communication resources, and/or the like), networking resources, and/or the like associated with generating correctly and incorrectly labeled images for training a computer vision model, generating an inoperable computer vision model based on training the computer vision model with the incorrectly labeled images, discovering and correcting the inoperable computer vision model, addressing user experience issues associated with the inoperable computer vision model, and/or the like.

Some implementations described herein relate to a labeling system that utilizes neural network models to label images. For example, the labeling system may receive unprocessed images to be labeled, and may utilize a first neural network model to identify objects of interest in the unprocessed images and bounding boxes for the objects of interest. The labeling system may annotate the objects of interest to generate annotated objects of interest, and may utilize a second neural network model to group the annotated objects of interest into clusters. The labeling system may utilize a third neural network model to determine labels for the clusters, and may request manually-generated labels for clusters for which labels are not determined by the third neural network model. The labeling system may receive the manually-generated labels based on requesting the manually-generated labels, and may label the unprocessed images with the labels and the manually-generated labels to generate labeled images. The labeling system may generate a training dataset based on the labeled images, and may train a computer vision model with the training dataset to generate a trained computer vision model.

In this way, the labeling system utilizes neural network models to label images. The labeling system may utilize neural network models to automatically identify objects of interest in images, and to automatically annotate the objects of interest in an unsupervised manner. The labeling system may group the objects of interest into clusters based on similarity and to determine labels for the images, and may propagate the labels to relevant images. This, in turn, conserves computing resources, networking resources, and/or the like that would otherwise have been consumed in generating correctly and incorrectly labeled images for training a computer vision model, generating an inoperable computer vision model based on training the computer vision model with the incorrectly labeled images, discovering and correcting the inoperable computer vision model, addressing user experience issues associated with the inoperable computer vision model, and/or the like.

FIGS. 1A-1G are diagrams of an example 100 associated with utilizing neural network models to label images. As shown in FIGS. 1A-1G, example 100 includes a user device 105 associated with a labeling system 110. Further details of the user device 105 and the labeling system 110 are provided elsewhere herein.

As shown in FIG. 1A, and by reference number 115, the labeling system 110 may receive unprocessed images to be labeled and pre-annotated image datasets identifying existing annotated images. For example, the labeling system 110 may receive the unprocessed images to be labeled from the user device 105. The unprocessed images to be labeled may include frames provided in one or more videos and to be labeled, images to be labeled, and/or the like. In some implementations, the labeling system 110 may receive the unprocessed images to be labeled from a source other than the user device 105. For example, the labeling system 110 may receive the unprocessed images to be labeled from a cloud-based device, a server device, the Internet, and/or the like. In some implementations, the labeling system 110 may receive the pre-annotated image datasets identifying the existing annotated images from the user device 105 and/or from another source (e.g., a cloud-based device, a server device, the Internet, and/or the like). The pre-annotated image datasets may include images that are labeled (e.g., annotated), objects of interest included in the annotated images, segmentation boundaries included in the annotated images, and/or the like.

As further shown in FIG. 1A, and by reference number 120, the labeling system 110 may train a first neural network model based on the pre-annotated image datasets. For example, the labeling system 110 may divide the pre-annotated image datasets into a first portion of pre-annotated image datasets, a second portion of pre-annotated image datasets, and a third portion of pre-annotated image datasets. The first portion, the second portion, and the third portion may include a same quantity of the pre-annotated image datasets, different quantities of the pre-annotated image datasets, and/or the like. In some implementations, more of the pre-annotated image datasets may be allotted to the first portion of pre-annotated image datasets since the first portion may be utilized to generate the training data set for the first neural network model.

The labeling system 110 may generate a training dataset for the first neural network model based on the first portion of pre-annotated image datasets. The labeling system 110 may generate a validation dataset for the first neural network model based on the second portion of pre-annotated image datasets. The labeling system 110 may generate a test dataset for the first neural network model based on the third portion of pre-annotated image datasets. In other implementations, the labeling system 110 may utilize different portions of the pre-annotated image datasets to generate the training dataset, the validation dataset, and/or the test dataset for the first neural network model.

The labeling system 110 may train the first neural network model with the training dataset to generate a trained first neural network model. As described elsewhere herein, the first neural network model may be trained to identify objects of interest in unprocessed images and bounding boxes for the objects of interest. In some implementations, rather than training the first neural network model, the labeling system 110 may obtain the trained first neural network model from another system or device that trained the first neural network model. In this case, the labeling system 110 may provide the other system or device with the training dataset, the validation dataset, and/or the test dataset for use in training the first neural network model, and may provide the other system or device with updated training, validation, and/or test datasets to retrain the first neural network model in order to update the first neural network model. In some implementations, the first neural network model may include a custom attention-based neural network model. An attention-based neural network model may include a sequence-to-sequence model that generates an output sequence given an input sequence.

In some implementations, the labeling system 110 may train the first neural network model with the training dataset to generate the trained first neural network model, and may process the validation dataset, with the trained first neural network model, to validate that the trained first neural network model is operating correctly. If the trained first neural network model is operating correctly, the labeling system 110 may process the trained first neural network model, with the test dataset, to further ensure that the trained first neural network model is operating correctly. A trained first neural network model can be said to be operating correctly if it has adequate accuracy, has adequate precision, has adequate recall, is not subject to excessive overfitting, and/or the like. If the trained first neural network model is operating excessively incorrectly, the labeling system 110 may modify the trained first neural network model and may revalidate and/or retest the modified first neural network model based on the validation dataset and/or the test dataset.

Figure 1B:
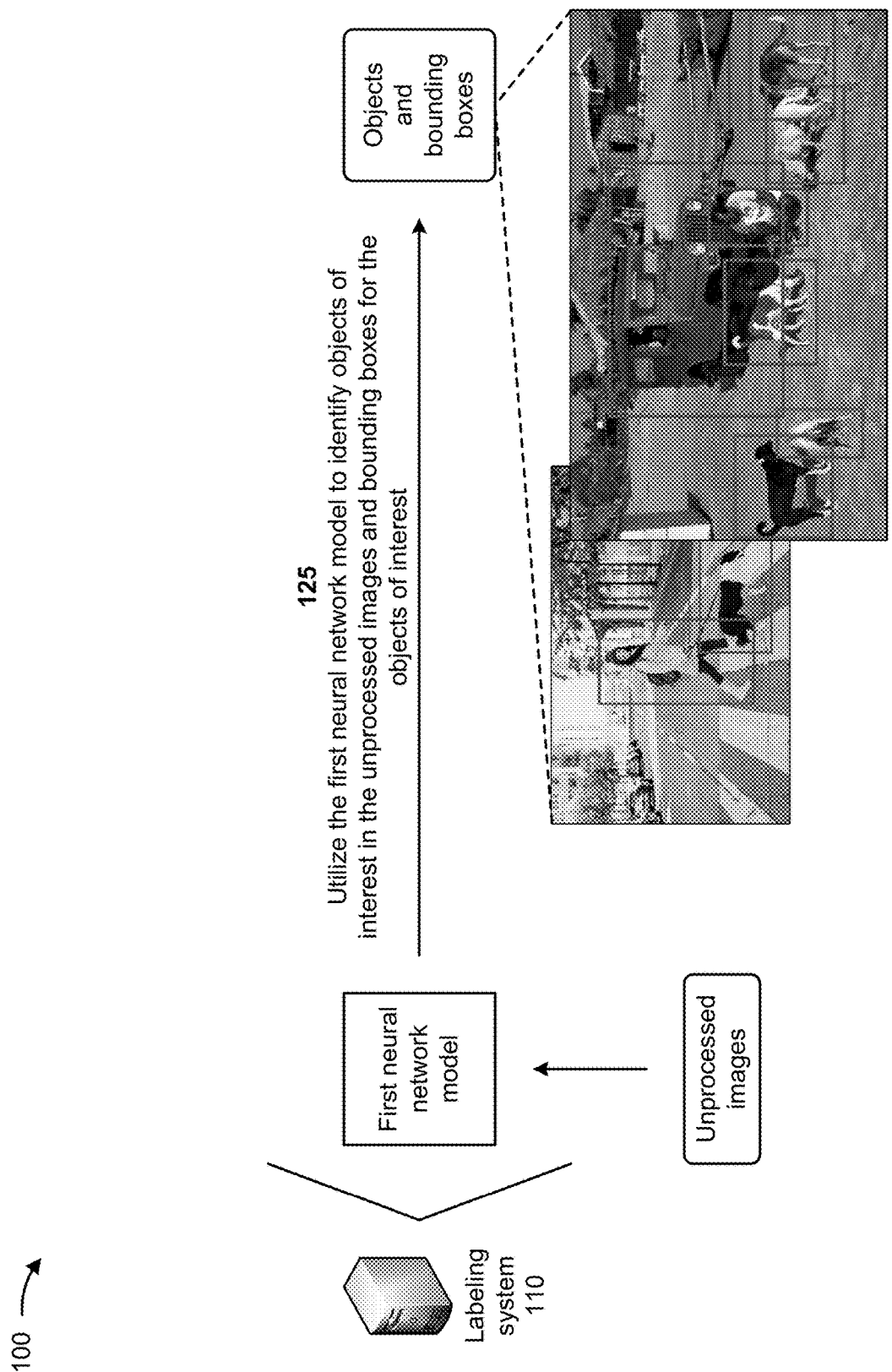

As shown in FIG. 1B, and by reference number 125, the labeling system 110 may utilize the first neural network model to identify objects of interest in the unprocessed images and bounding boxes for the objects of interest. For example, after training the first neural network model to generate a trained first machine learning model (e.g., a trained first neural network model), the labeling system 110 may process the unprocessed images, with the trained first neural network model, to identify the objects of interest in the unprocessed images and the bounding boxes for the objects of interest. As shown, the trained first neural network model may identify, in the unprocessed images, the objects of interest, such as people, animals (e.g., dogs), vehicles, and/or the like. The trained first neural network model may identify segmentation boundaries for the objects of interest, and may predict coordinates of the bounding boxes (e.g., the boxes provided around the people, the animals, the vehicles, and/or the like) for the objects of interest based on the segmentation boundaries.

Figure 1C:
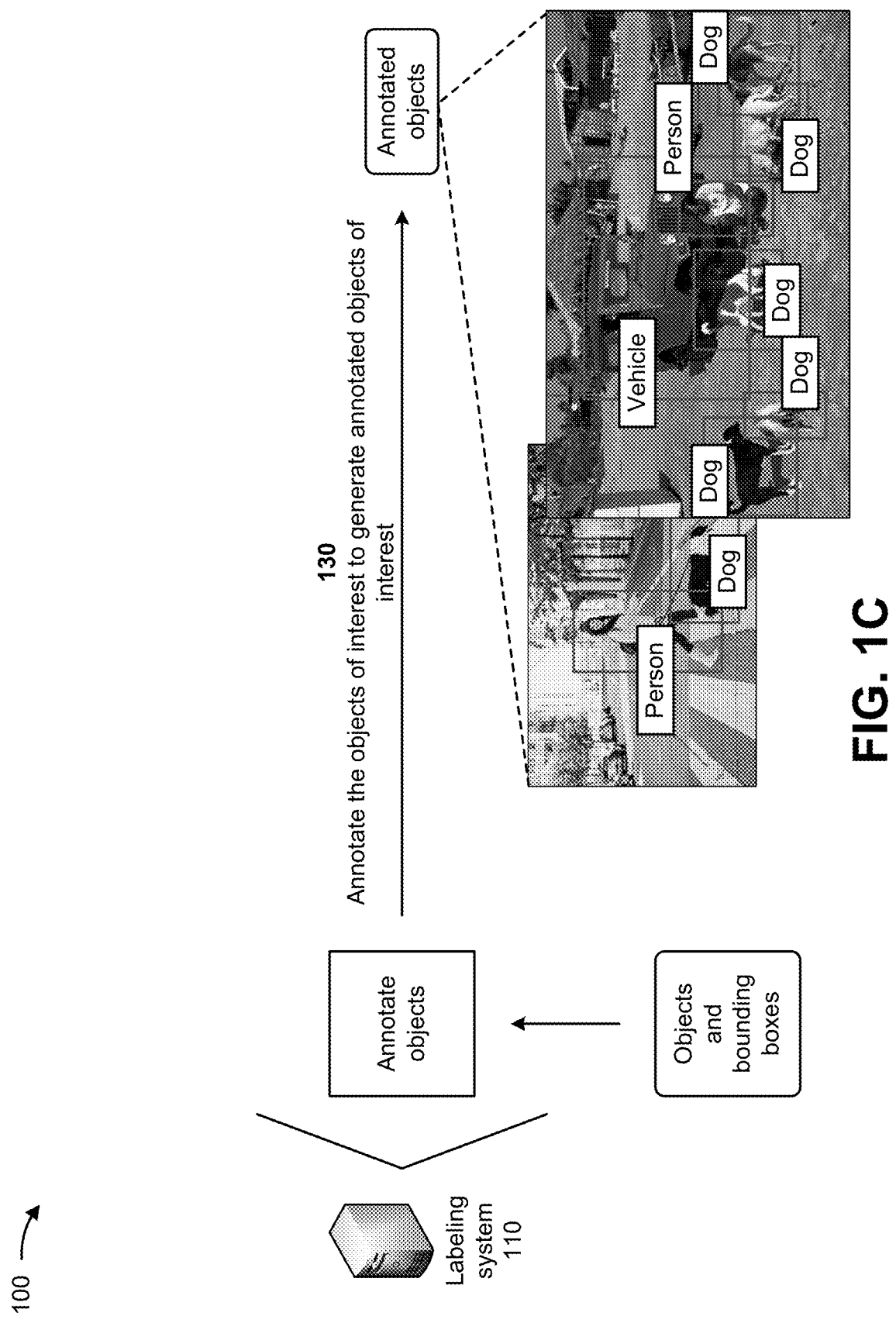

As shown in FIG. 1C, and by reference number 130, the labeling system 110 may annotate the objects of interest to generate annotated objects of interest. For example, the labeling system 110 may utilize the trained first machine learning model (e.g., the trained first neural network model) to annotate (e.g., label) the objects of interest in the unprocessed images and to generate the annotated objects of interest. As shown, the trained first neural network model may annotate each of the people with a "person" label, may annotate each of the dogs with a "dog" label, and may annotate each of the vehicles with a "vehicle" label.

As shown in FIG. 1D, and by reference number 135, the labeling system 110 may utilize a second neural network model to group the annotated objects of interest into clusters. For example, the labeling system 110 may process the annotated objects of interest, with the second neural network model, to group the annotated objects of interest into the clusters. As shown, the second neural network model may group the images of the dogs into a first cluster (e.g., Cluster 1), the images of the people into a second cluster (e.g., Cluster 2), and the images of the vehicles into a third cluster (e.g., Cluster 3). In some implementations, a quantity of clusters generated by the second neural network model may be configurable.

In some implementations, the second neural network model may include a clustering model. A clustering model may use cluster analysis (also known as clustering) to perform machine learning. Cluster analysis is the task of grouping a set of objects in such a way that objects in the same group (called a cluster) are more similar (in some aspects of the object) to each other than to objects in other groups (clusters). Cluster analysis can be achieved by various algorithms that differ significantly in their notion of what constitutes a cluster and how to efficiently find clusters. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where a k-means algorithm represents each cluster by a single mean vector), distribution models (e.g., where clusters are modeled using statistical distributions, such as multivariate normal distributions used by an expectation-maximization algorithm), density models (e.g., where clusters are defined as connected dense regions in a data space), and/or the like.

Figure 1E:
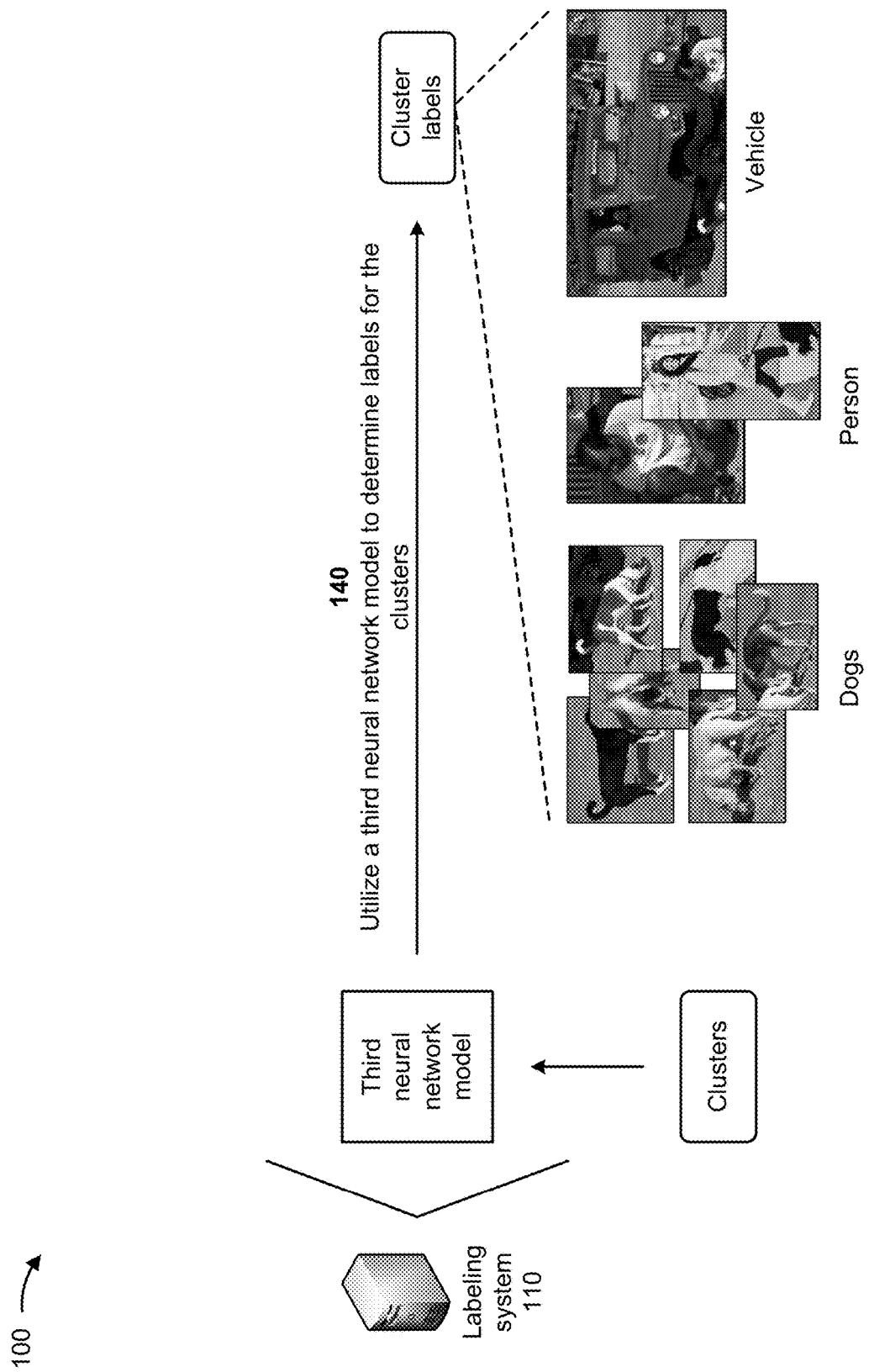

As shown in FIG. 1E, and by reference number 140, the labeling system 110 may utilize a third neural network model to determine labels for the clusters. For example, the third neural network model may include an object classification model that is trained with known object classes (e.g., an image database, such as ImageNet, in which each node of a hierarchy is depicted by hundreds or thousands of images). The labeling system 110 may select a representative image of each cluster (e.g., a first image, a second image, a random image, and/or the like of each cluster), and may utilize the third neural network model to compare the representative image of each cluster with the known object classes to generate confidence scores for different known object classes. The third neural network model may classify each cluster, and the objects of interest in each cluster, based on the confidence scores for the different known object classes. The third neural network model may label each cluster based on the classification for each cluster. For example, the third neural network model may compare an image of a dog (e.g., from the first cluster) with known object classes for dogs, people, and vehicles, and may generate a first confidence score (e.g., 95%) for the dog object class, a second confidence score (e.g., 30%) for the people object class, and a third confidence score (e.g., 5%) for the vehicle object class. Based on confidence scores, the third neural network model may classify the first cluster in the dog object class, and may label the first cluster as being associated with the dog object class (e.g., with a "dog" label).

Figure 1F:
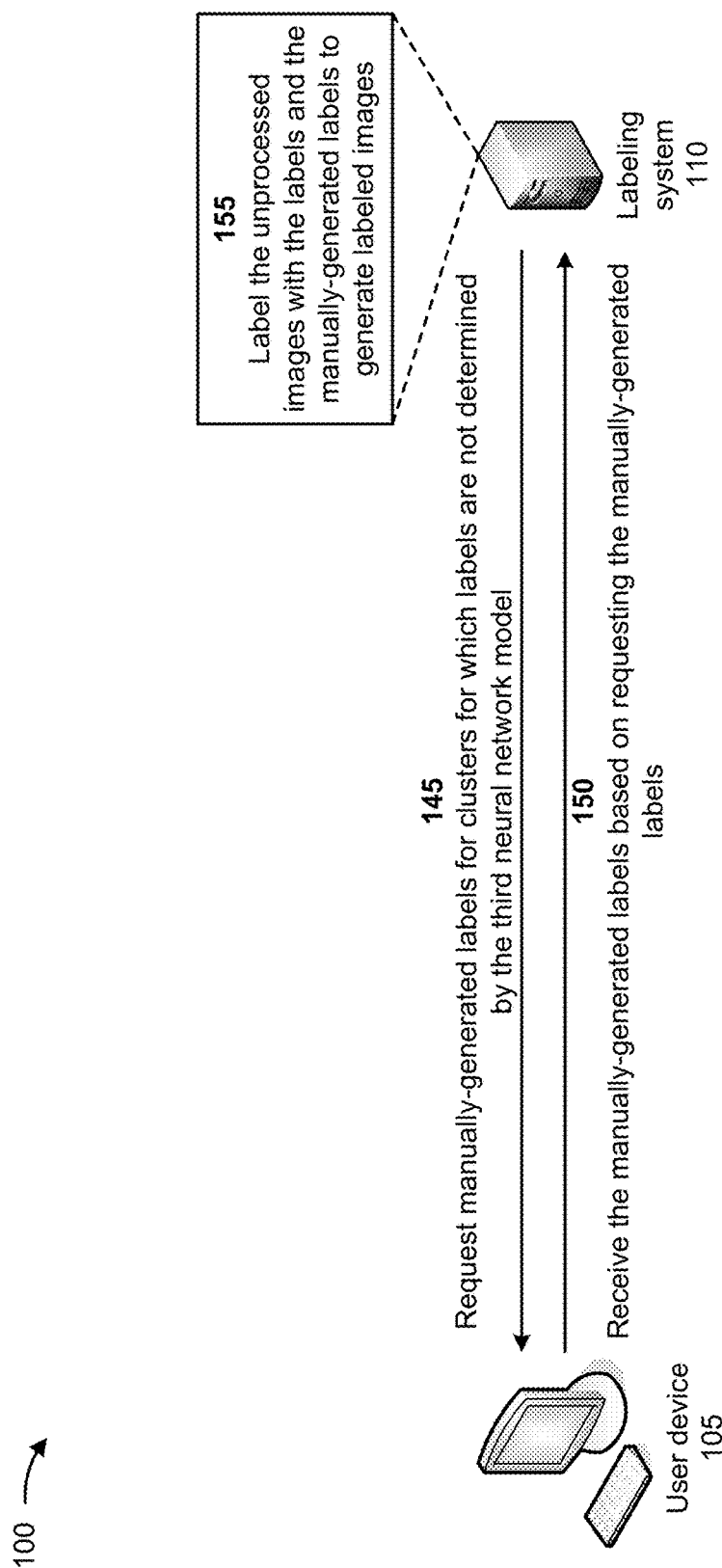

As shown in FIG. 1F, and by reference number 145, the labeling system 110 may request manually-generated labels for clusters for which labels are not determined by the third neural network model. For example, if the third neural network model cannot determine a label for one or more clusters, the labeling system 110 may generate a request for manually-generated labels for the one or more clusters not determined by the third neural network model. The request may include one or more representative images of each of the one or more clusters. The labeling system 110 may provide the request for the manually-generated labels to the user device 105, as shown in FIG. 1F. In some implementations, the labeling system 110 may identify the clusters for which labels are not determined by the third neural network model based on the confidence scores generated by the third neural network model for the clusters. For example, if a greatest confidence score generated by the third neural network model for the third cluster (e.g., the vehicle cluster) fails to satisfy a threshold confidence score (e.g., 10%, 20%, and/or the like), the labeling system 110 may determine that the third neural network model is unable to determine a label for the third cluster. In such an example, the labeling system 110 may request (e.g., from the user device 105) a manually-generated label for the third cluster.

As further shown in FIG. 1F, and by reference number 150, the labeling system 110 may receive the manually-generated labels based on requesting the manually-generated labels. For example, the user device 105 may receive the request for the manually-generated labels for the one or more clusters not determined by the third neural network model. A user of the user device 105 may review the representative images included in the request, and may input, to the user device 105, the manually-generated labels for the one or more clusters not determined by the third neural network model based on the representative images. The user device 105 may provide the manually-generated labels to the labeling system 110, and the labeling system 110 may receive the manually-generated labels from the user device 105.

As further shown in FIG. 1F, and by reference number 155, the labeling system 110 may label the unprocessed images with the labels and the manually-generated labels to generate labeled images. For example, the labeling system 110 may label the unprocessed images in each cluster with the labels, generated by the third neural network model, and with the manually-generated labels, generated by the user device 105 for any clusters not identified by the third neural network model, to generate the labeled images. In some implementations, the labeling system 110 may label the unprocessed images in the first cluster with a "dog" label, may label the unprocessed images in the second cluster with a "person" label, may label the unprocessed images in the third cluster with a "vehicle" label, and/or the like, to generate the labeled images.

In some implementations, the labeling system 110 may train, validate, and/or test a computer vision model, with the labeled images, to generate a trained computer vision model. For example, the labeling system 110 may divide the labeled images into a first portion of labeled images, a second portion of labeled images, and a third portion of labeled images. The first portion, the second portion, and the third portion may include a same quantity of the labeled images, different quantities of the labeled images, and/or the like. In some implementations, more of the labeled images may be allotted to the first portion of final data since the first portion may be utilized to generate the training dataset for the computer vision model.

The labeling system 110 may generate a training dataset for the computer vision model based on the first portion of final data. The labeling system 110 may generate a validation dataset for the computer vision model based on the second portion of final data. The labeling system 110 may generate a test dataset for the computer vision model based on the third portion of final data. In other implementations, the labeling system 110 may utilize different portions of the labeled images to generate the training dataset, the validation dataset, and/or the test dataset for the computer vision model.

The labeling system 110 may train the computer vision model with the training dataset to generate the trained computer vision model. The computer vision model may be trained to process image data and to predict labels for the image data based on processing the image data. In some implementations, rather than training the computer vision model, the labeling system 110 may obtain the trained computer vision model from another system or device that trained the computer vision model. In this case, the labeling system 110 may provide the other system or device with the training dataset, the validation dataset, and/or the test dataset for use in training the computer vision model, and may provide the other system or device with updated training, validation, and/or test datasets to retrain the computer vision model in order to update the computer vision model.

In some implementations, the labeling system 110 may train the computer vision model with the training dataset to generate the trained computer vision model, and may process the validation dataset, with the trained computer vision model, to validate that the trained computer vision model is operating correctly. If the trained computer vision model is operating correctly, the labeling system 110 may process the trained computer vision model, with the test dataset, to further ensure that the trained computer vision model is operating correctly. A trained computer vision model can be said to be operating correctly if it has adequate accuracy, has adequate precision, has adequate recall, is not biased, and/or the like. If the trained computer vision model is operating incorrectly, the labeling system 110 may modify the trained computer vision model and may revalidate and/or retest the modified computer vision model based on the validation dataset and/or the test dataset.

Figure 1G:
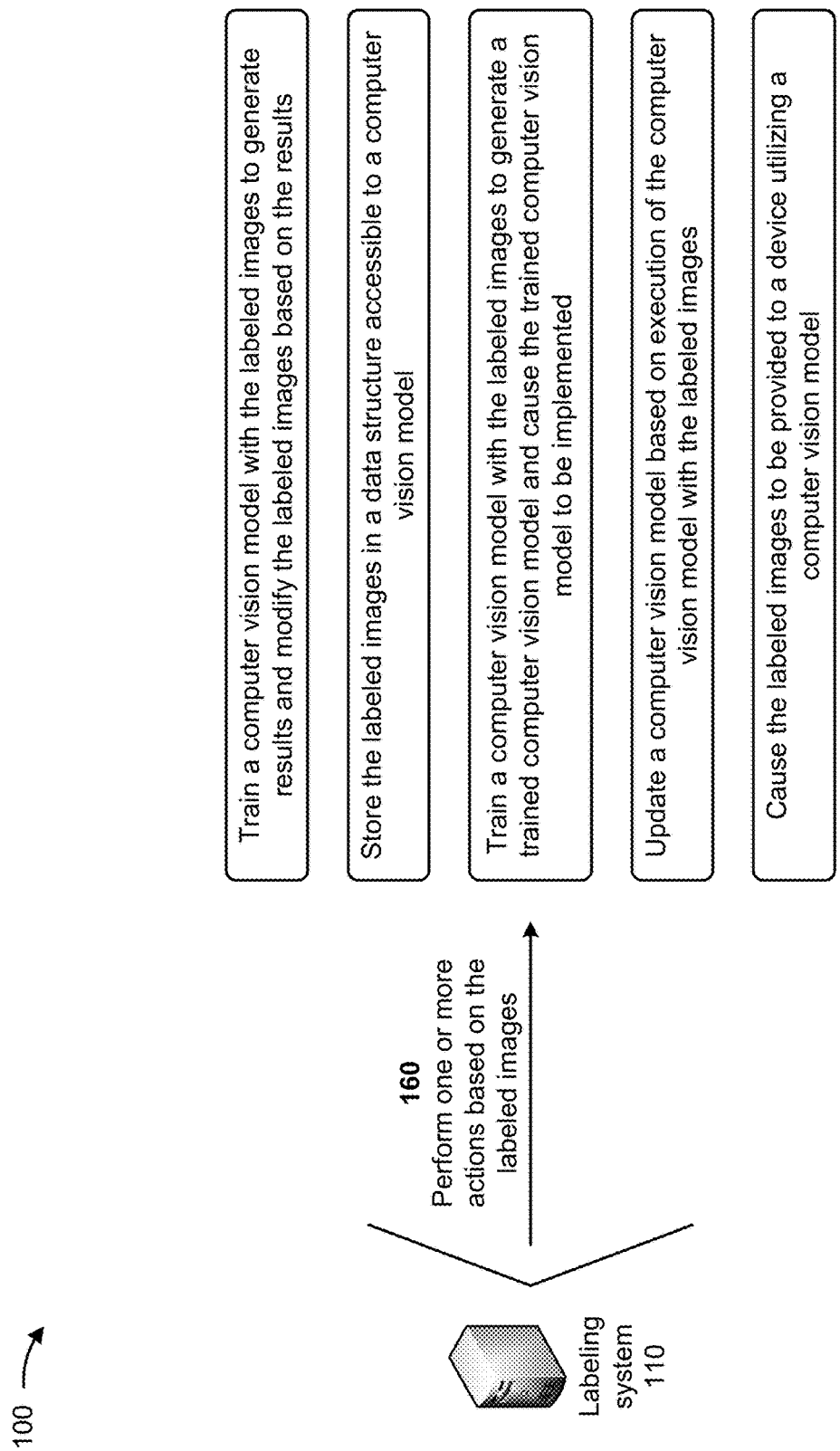

As shown in FIG. 1G, and by reference number 160, the labeling system 110 may perform one or more actions based on the labeled images. In some implementations, performing the one or more actions includes the labeling system 110 training a computer vision model with the labeled images to generate results and modifying the labeled images based on the results. For example, the labeling system 110 may train a computer vision model with the labeled images, and the computer vision model may produce predictions (e.g., results) based on training the computer vision model. The labeling system 110 may utilize the predictions to modify and improve the labeled images. In this way, the labeling system 110 conserves computing resources, networking resources, and/or the like that would otherwise have been consumed in generating incorrectly labeled images for training a computer vision model, generating an inoperable computer vision model based on training the computer vision model with the incorrectly labeled images, discovering and correcting the inoperable computer vision model, addressing user experience issues associated with the inoperable computer vision model, and/or the like.

In some implementations, performing the one or more actions includes the labeling system 110 storing the labeled images in a data structure accessible to a computer vision model. For example, the labeling system 110 may store the labeled images in a data structure so that the computer vision model (e.g., provided in the user device 105) may access and utilize the labeled images to train, validate, and/or test the computer vision model. In this way, the labeling system 110 conserves computing resources, networking resources, and/or the like that would otherwise have been consumed in generating an inoperable computer vision model based on training the computer vision model with the incorrectly labeled images, discovering and correcting the inoperable computer vision model, addressing user experience issues associated with the inoperable computer vision model, and/or the like.

In some implementations, performing the one or more actions includes the labeling system 110 training a computer vision model with the labeled images to generate a trained computer vision model and causing the trained computer vision model to be implemented. For example, the labeling system 110 may train a computer vision model with the labeled images and may cause the user device 105 to implement the trained computer vision model with real-time data. The user device 105 may process the real-time data, with the trained computer vision model, to make predictions. In this way, the labeling system 110 conserves computing resources, networking resources, and/or the like that would otherwise have been consumed in discovering and correcting an inoperable computer vision model based on training the computer vision model with incorrectly labeled images, addressing user experience issues associated with the inoperable computer vision model, and/or the like.

In some implementations, performing the one or more actions includes the labeling system 110 updating a computer vision model based on execution of the computer vision model with the labeled images. For example, the labeling system 110 may process the labeled images with a computer vision model to generate predictions. The labeling system 110 may determine that the predictions are incorrect and may modify or update the computer vision model based on the incorrect predictions. In this way, the labeling system 110 conserves computing resources, networking resources, and/or the like that would otherwise have been consumed in generating an inoperable computer vision model based on training the computer vision model with the incorrectly labeled images, discovering and correcting the inoperable computer vision model, and/or the like.

In some implementations, performing the one or more actions includes the labeling system 110 causing the labeled images to be provided to a device utilizing a computer vision model. For example, the labeling system 110 may provide the labeled images to the user device 105 utilizing a computer vision model. The user device 105 may train the computer vision model, with the labeled images, to generate a trained computer vision model. The user device 105 may process real-time data, with the trained computer vision model, to make predictions. In this way, the labeling system 110 conserves computing resources, networking resources, and/or the like that would otherwise have been consumed in generating an inoperable computer vision model based on training the computer vision model with the incorrectly labeled images, addressing user experience issues associated with the inoperable computer vision model, and/or the like.

In this way, the labeling system 110 utilizes neural network models to label images. The labeling system 110 may utilize neural network models to automatically identify objects of interest in images, and to automatically annotate the objects of interest in an unsupervised manner. The labeling system 110 may group the objects of interest into clusters based on similarity and to determine labels for the images, and may propagate the labels to relevant images. This, in turn, conserves computing resources, networking resources, and/or the like that would otherwise have been consumed in generating correctly and incorrectly labeled images for training a computer vision model, generating an inoperable computer vision model based on training the computer vision model with the incorrectly labeled images, discovering and correcting the inoperable computer vision model, addressing user experience issues associated with the inoperable computer vision model, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
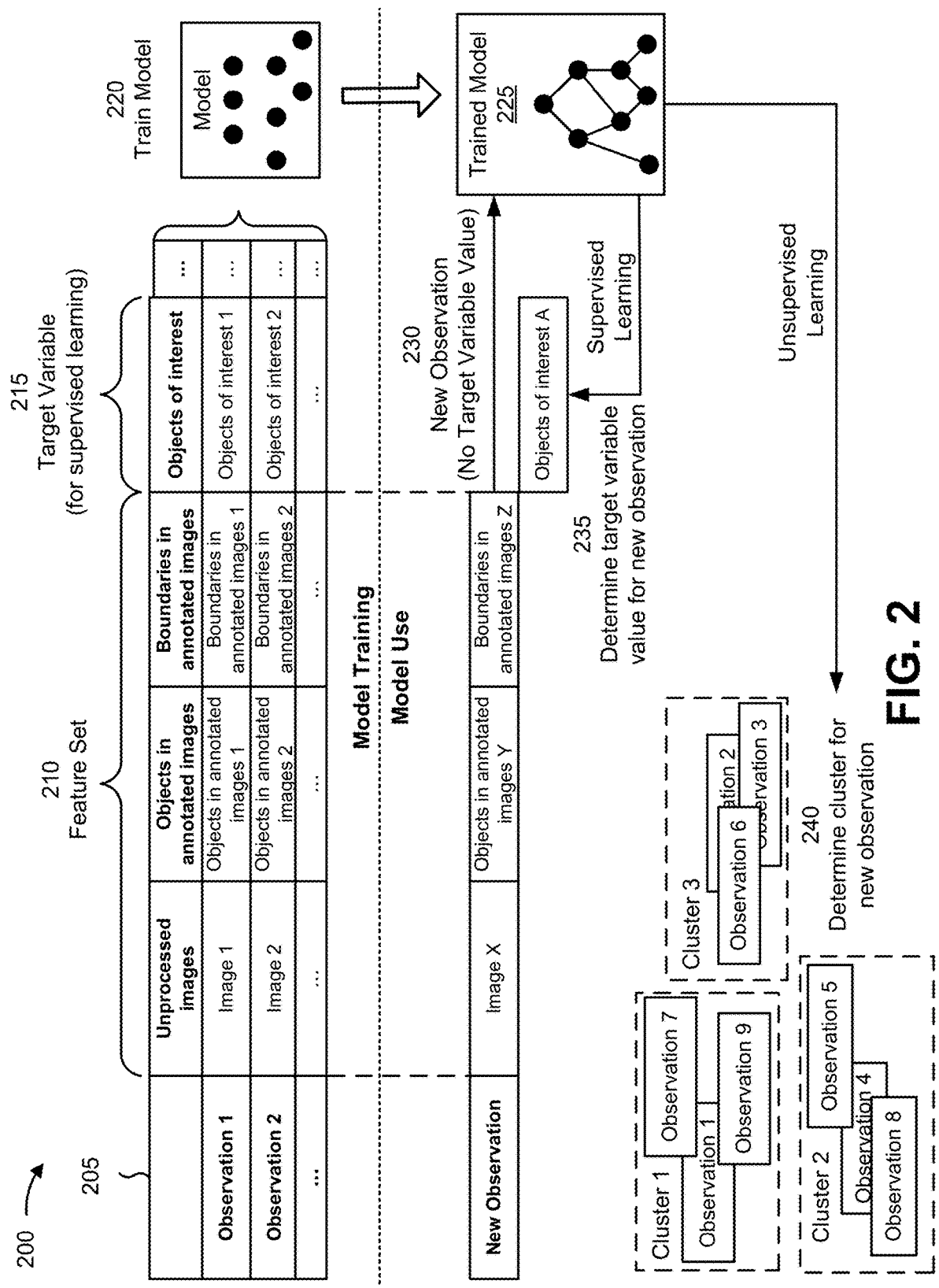
FIG. 2 is a diagram illustrating an example of training and using a machine learning model in connection with labeling images.

FIG. 2 is a diagram illustrating an example 200 of training and using a machine learning model in connection with labeling images. The machine learning model training and usage described herein may be performed using a machine learning system. The machine learning system may include or may be included in a computing device, a server, a cloud computing environment, or the like, such as the labeling system 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the labeling system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the labeling system 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of unprocessed images, a second feature of objects in annotated images, a third feature of boundaries in annotated images, and so on. As shown, for a first observation, the first feature may have a value of image 1, the second feature may have a value of objects in annotated images 1, the third feature may have a value of boundaries in annotated images 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is objects of interest, which has a value of objects of interest 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model. In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of image X, a second feature of objects in annotated images Y, a third feature of boundaries in annotated images Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of objects of interest A for the target variable of objects of interest for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an unprocessed images cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an objects in automated images cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to label images. The machine learning system enables recognition and/or identification of tens, hundreds, thousands, or millions of features and/or feature values for tens, hundreds, thousands, or millions of observations, thereby increasing accuracy and consistency and reducing delay associated with labeling images relative to requiring computing resources to be allocated for tens, hundreds, or thousands of operators to manually label images using the features or feature values.

As indicated above, FIG. 2 is provided as an example. Other examples may differ from what is described in connection with FIG. 2.

Figure 3:
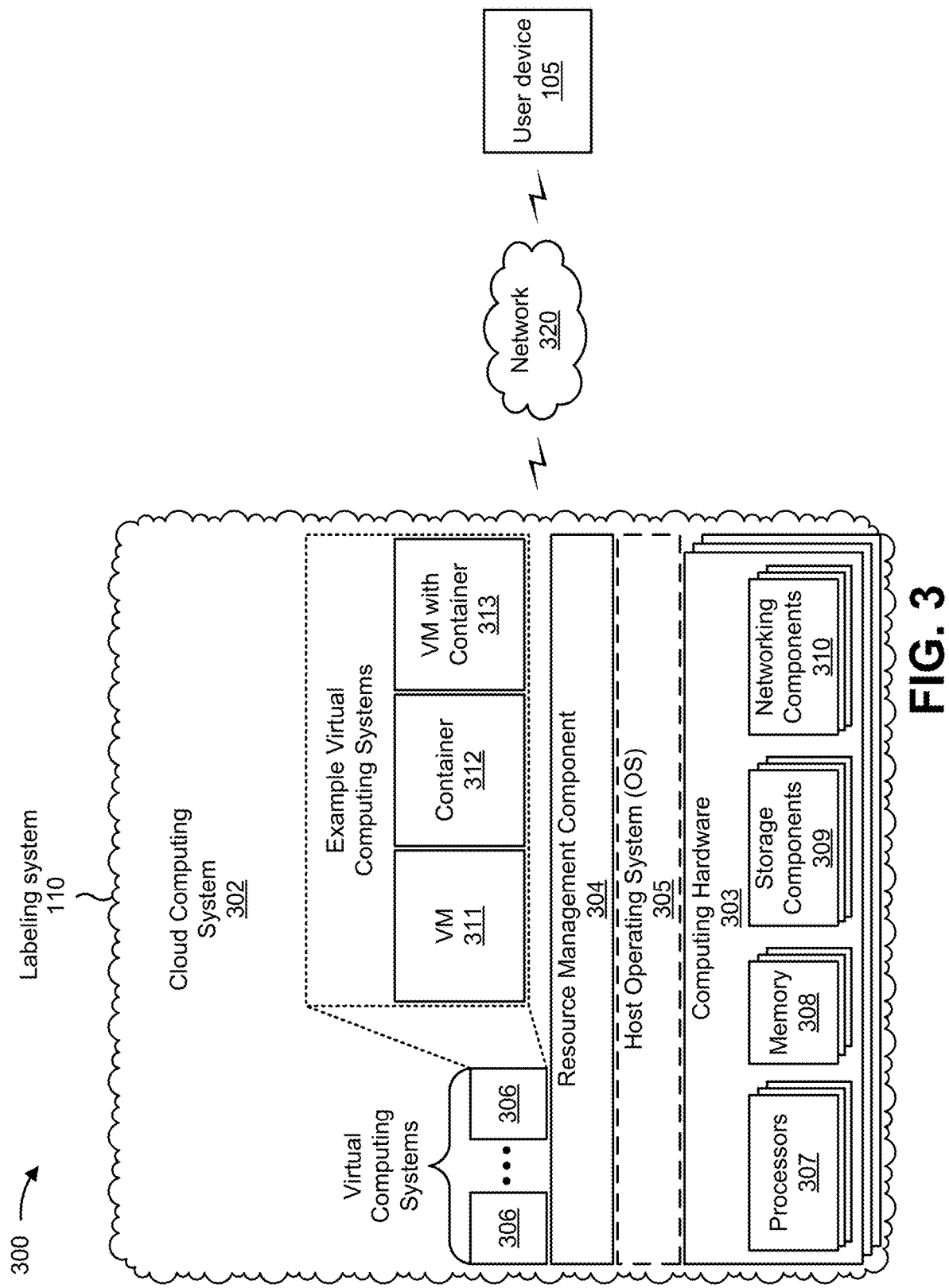
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the labeling system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the labeling system 110 may include one or more elements 303-313 of the cloud computing system 302, may execute within the cloud computing system 302, and/or may be hosted within the cloud computing system 302, in some implementations, the labeling system 110 may not be cloud-based (e.g., may be implemented outside of a cloud computing system) or may be partially cloud-based. For example, the labeling system 110 may include one or more devices that are not part of the cloud computing system 302, such as a device 400 of FIG. 4, which may include a standalone server or another type of computing device. The labeling system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
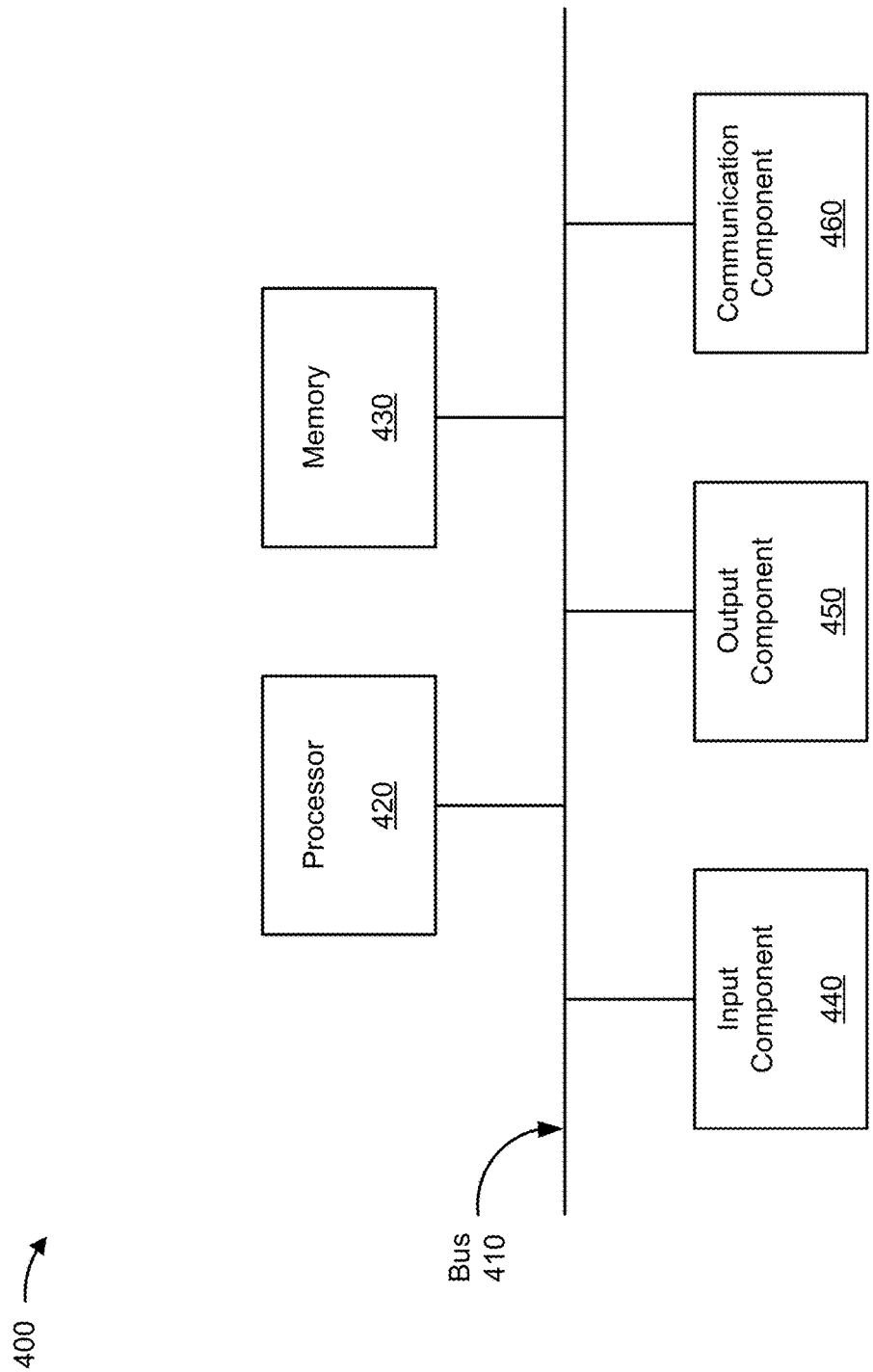
FIG. 4 is a diagram of example components of one or more devices of FIG. 3.

FIG. 4 is a diagram of example components of a device 400, which may correspond to the user device 105 and/or the labeling system 110. In some implementations, the user device 105 and/or the labeling system 110 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
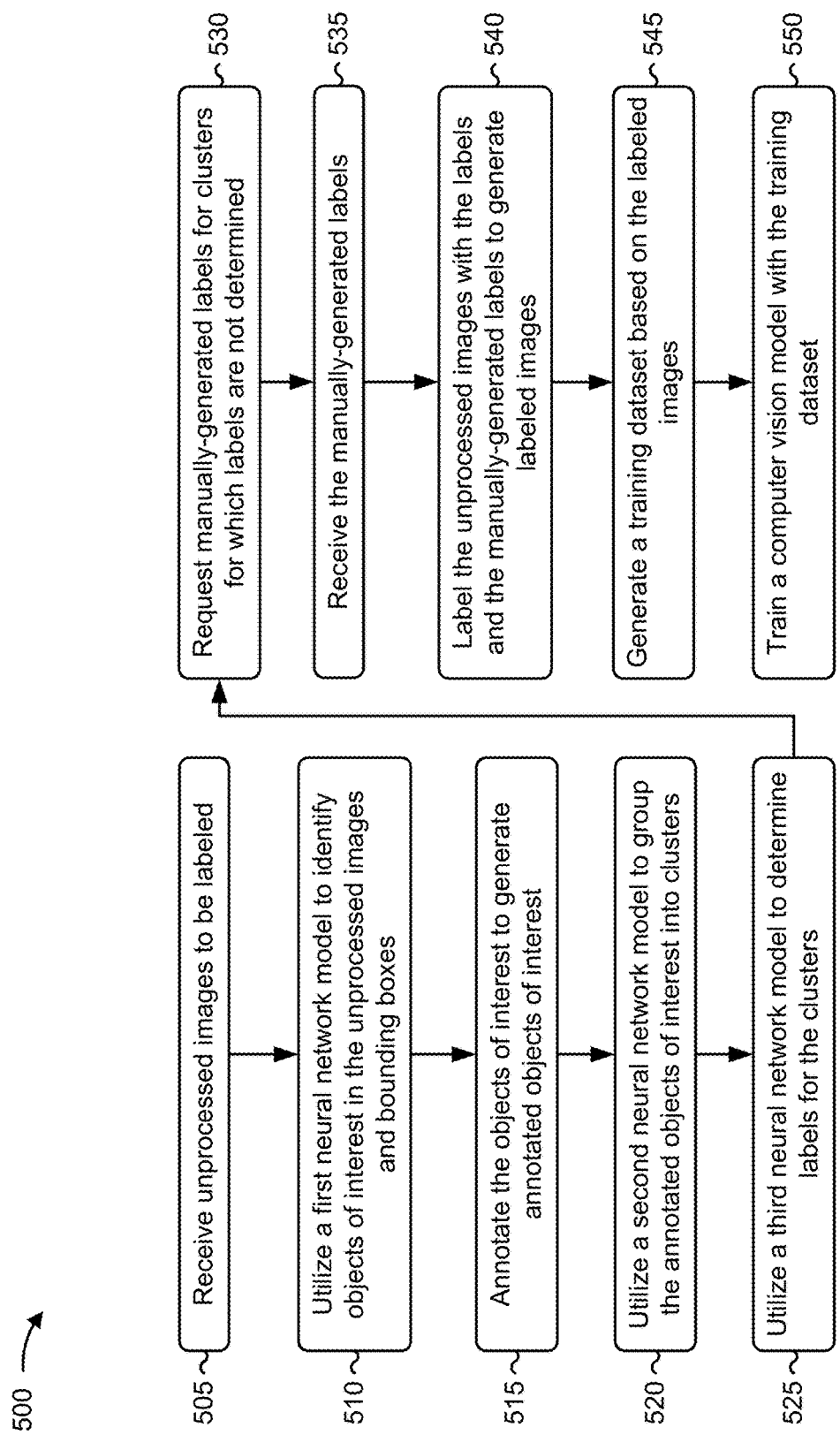
FIG. 5 is a flowchart of an example process for utilizing neural network models to label images.

FIG. 5 is a flowchart of an example process 500 for utilizing neural network models to label images. In some implementations, one or more process blocks of FIG. 5 may be performed by a device (e.g., the labeling system 110). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication interface 460.

As shown in FIG. 5, process 500 may include receiving unprocessed images to be labeled (block 505). For example, the device may receive unprocessed images to be labeled, as described above.

As further shown in FIG. 5, process 500 may include utilizing a first neural network model to identify objects of interest in the unprocessed images and bounding boxes (block 510). For example, the device may utilize a first neural network model to identify objects of interest in the unprocessed images and bounding boxes for the objects of interest, as described above. In some implementations, the first neural network model is a custom attention-based neural network model. In some implementations, utilizing the first neural network model to identify the objects of interest in the unprocessed images and the bounding boxes for the objects of interest includes identifying segmented boundaries around the objects of interest in the unprocessed images, and predicting coordinates of the bounding boxes for the objects of interest based on the segmented boundaries.

As further shown in FIG. 5, process 500 may include annotating the objects of interest to generate annotated objects of interest (block 515). For example, the device may annotate the objects of interest to generate annotated objects of interest, as described above.

As further shown in FIG. 5, process 500 may include utilizing a second neural network model to group the annotated objects of interest into clusters (block 520). For example, the device may utilize a second neural network model to group the annotated objects of interest into clusters, as described above. In some implementations, the second neural network model is a clustering neural network model.

As further shown in FIG. 5, process 500 may include utilizing a third neural network model to determine labels for the clusters (block 525). For example, the device may utilize a third neural network model to determine labels for the clusters, as described above. In some implementations, the third neural network model is an object classification neural network model. In some implementations, utilizing the third neural network model to determine the labels for the clusters includes classifying the objects of interest in the unprocessed images, generating confidence scores for classifications of the objects of interest, and labeling the objects of interest based on the confidence scores.

As further shown in FIG. 5, process 500 may include requesting manually-generated labels for clusters for which labels are not determined (block 530). For example, the device may request manually-generated labels for clusters for which labels are not determined by the third neural network model, as described above.

As further shown in FIG. 5, process 500 may include receiving the manually-generated labels (block 535). For example, the device may receive the manually-generated labels based on requesting the manually-generated labels, as described above.

As further shown in FIG. 5, process 500 may include labeling the unprocessed images with the labels and the manually-generated labels to generate labeled images (block 540). For example, the device may label the unprocessed images with the labels and the manually-generated labels to generate labeled images, as described above.

As further shown in FIG. 5, process 500 may include generating a training dataset based on the labeled images (block 545). For example, the device may generate a training dataset based on the labeled images, as described above.

As further shown in FIG. 5, process 500 may include training a computer vision model with the training dataset (block 550). For example, the device may train a computer vision model with the training dataset to generate a trained computer vision model, as described above.

In some implementations, process 500 includes receiving pre-annotated image datasets identifying existing annotated images, and training the first neural network model based on the pre-annotated image datasets, prior to utilizing the first neural network model. In some implementations, process 500 includes generating a validation dataset for the computer vision model based on the labeled images, and validating the computer vision model with the validation dataset. In some implementations, process 500 includes generating a test dataset for the computer vision model based on the labeled images, and testing the computer vision model with the test dataset.

In some implementations, process 500 includes utilizing the trained computer vision model to identify objects of interest in other unprocessed images. In some implementations, process 500 includes storing the labeled images in a data structure accessible to the computer vision model. In some implementations, process 500 includes causing the trained computer vision model to be implemented by a user device, where the user device is configured to utilize the trained computer vision model to identify objects of interest in other unprocessed images. In some implementations, process 500 includes updating the computer vision model based on execution of the computer vision model with the labeled images.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, unprocessed images to be labeled;
    utilizing, by the device, a first neural network model to identify objects of interest in the unprocessed images and bounding boxes for the objects of interest;
    annotating, by the device, the objects of interest to generate annotated objects of interest;
    utilizing, by the device, a second neural network model to group the annotated objects of interest into clusters;
    utilizing, by the device, a third neural network model to determine labels for the clusters;
    requesting, by the device, manually-generated labels for clusters for which labels are not determined by the third neural network model;
    receiving, by the device, the manually-generated labels based on requesting the manually-generated labels;
    labeling, by the device, the unprocessed images with the labels and the manually-generated labels to generate labeled images;
    generating, by the device, a training dataset based on the labeled images; and
    training, by the device, a computer vision model with the training dataset to generate a trained computer vision model.

2. The method of claim 1, further comprising:
receiving pre-annotated image datasets identifying existing annotated images; and
training the first neural network model based on the pre-annotated image datasets, prior to utilizing the first neural network model.

3. The method of claim 1, further comprising:
generating a validation dataset for the computer vision model based on the labeled images; and
validating the computer vision model with the validation dataset.

4. The method of claim 1, further comprising:
generating a test dataset for the computer vision model based on the labeled images; and
testing the computer vision model with the test dataset.

5. The method of claim 1, further comprising:
utilizing the trained computer vision model to identify objects of interest in other unprocessed images.

6. The method of claim 1, further comprising:
storing the labeled images in a data structure accessible to the computer vision model.

7. The method of claim 1, further comprising:
causing the trained computer vision model to be implemented by a user device,
wherein the user device is configured to utilize the trained computer vision model to identify objects of interest in other unprocessed images.

8. A device, comprising:
one or more processors configured to:
receive unprocessed images to be labeled and pre-annotated image datasets identifying existing annotated images;
train a first neural network model based on the pre-annotated image datasets;
utilize the first neural network model to identify objects of interest in the unprocessed images and bounding boxes for the objects of interest;
annotate the objects of interest to generate annotated objects of interest;
utilize a second neural network model to group the annotated objects of interest into clusters;
utilize a third neural network model to determine labels for the clusters;
request manually-generated labels for clusters for which labels are not determined by the third neural network model;
receive the manually-generated labels based on requesting the manually-generated labels;
label the unprocessed images with the labels and the manually-generated labels to generate labeled images;
generate a training dataset based on the labeled images; and
train a computer vision model with the training dataset to generate a trained computer vision model.

9. The device of claim 8, wherein the one or more processors are further configured to:
update the computer vision model based on execution of the computer vision model with the labeled images.

10. The device of claim 8, wherein the first neural network model is a custom attention-based neural network model.

11. The device of claim 8, wherein the one or more processors, to utilize the first neural network model to identify the objects of interest in the unprocessed images and the bounding boxes for the objects of interest, are configured to:
identify segmented boundaries around the objects of interest in the unprocessed images; and
predict coordinates of the bounding boxes for the objects of interest based on the segmented boundaries.

12. The device of claim 8, wherein the second neural network model is a clustering neural network model.

13. The device of claim 8, wherein the third neural network model is an object classification neural network model.

14. The device of claim 8, wherein the one or more processors, to utilize the third neural network model to determine the labels for the clusters, are configured to:
classify the objects of interest in the unprocessed images;
generate confidence scores for classifications of the objects of interest; and
label the objects of interest based on the confidence scores.

15. A non-transitory computer-readable medium storing a set of instructions, the set of instructions comprising:
one or more instructions that, when executed by one or more processors of a device, cause the device to:
receive unprocessed images to be labeled;
utilize a first neural network model to identify objects of interest in the unprocessed images and bounding boxes for the objects of interest;
annotate the objects of interest to generate annotated objects of interest;
utilize a second neural network model to group the annotated objects of interest into clusters;
utilize a third neural network model to determine labels for the clusters;
request manually-generated labels for clusters for which labels are not determined by the third neural network model;
receive the manually-generated labels based on requesting the manually-generated labels;
label the unprocessed images with the labels and the manually-generated labels to generate labeled images;
generate a training dataset based on the labeled images;
train a computer vision model with the training dataset to generate a trained computer vision model;
generate a validation dataset for the computer vision model based on the labeled images; and
validate the computer vision model with the validation dataset.

16. The non-transitory computer-readable medium of claim 15, wherein the one or more instructions further cause the device to one or more of:
utilize the trained computer vision model to identify objects of interest in other unprocessed images; or
store the labeled images in a data structure accessible to the computer vision model.

17. The non-transitory computer-readable medium of claim 15, wherein the one or more instructions further cause the device to:
cause the trained computer vision model to be implemented by a user device,
wherein the one or more instructions further cause the device to utilize the trained computer vision model to identify objects of interest in other unprocessed images.

18. The non-transitory computer-readable medium of claim 15, wherein the one or more instructions further cause the device to:
update the computer vision model based on execution of the computer vision model with the labeled images.

19. The non-transitory computer-readable medium of claim 15, wherein the one or more instructions, that cause the device to utilize the first neural network model to identify the objects of interest in the unprocessed images and the bounding boxes for the objects of interest, cause the device to:
- identify segmented boundaries around the objects of interest in the unprocessed images; and
- predict coordinates of the bounding boxes for the objects of interest based on the segmented boundaries.

20. The non-transitory computer-readable medium of claim 15, wherein the one or more instructions, that cause the device to utilize the third neural network model to determine the labels for the clusters, cause the device to:
- classify the objects of interest in the unprocessed images;
- generate confidence scores for classifications of the objects of interest; and
- label the objects of interest based on the confidence scores.

* * * * *